United States Patent [19]

Duvet et al.

[11] 4,427,218
[45] Jan. 24, 1984

[54] PRESSURE CONDUIT CONNECTING DEVICE

[75] Inventors: Claude Duvet; Michel Iato, both of Pau, France

[73] Assignee: Societe Nationale Elf Aquitaine (Production), Courbevoie, France

[21] Appl. No.: 235,596

[22] Filed: Feb. 18, 1981

[30] Foreign Application Priority Data

Feb. 22, 1980 [FR] France .................................. 80 03941

[51] Int. Cl.³ .......................................... F16L 27/04
[52] U.S. Cl. ..................................... 285/184; 285/261;
 285/315; 285/323; 285/341; 285/354; 285/368; 285/DIG. 7
[58] Field of Search ............... 285/261, 322, 184, 323, 285/266, 341, 231, 315, 354, 368, DIG. 7

[56] References Cited

U.S. PATENT DOCUMENTS

| | | | |
|---|---|---|---|
| 1,824,792 | 9/1931 | Reure | 285/271 |
| 1,949,829 | 3/1934 | Ellis | 285/341 X |
| 2,085,922 | 7/1937 | Moore | 285/266 |
| 3,874,706 | 3/1975 | Arnold | 285/184 |
| 4,045,054 | 8/1977 | Arnold | 285/184 |
| 4,188,050 | 2/1980 | Lochte | 285/184 |

*Primary Examiner*—Dave W. Arola
*Attorney, Agent, or Firm*—Brisebois & Kruger

[57] ABSTRACT

In a device for interconnecting respective ends of two conduits a male connecting piece (2) is fixed on the end of one of conduits and provided on its outer periphery with annular ridges (4), while a female connecting piece is fixed to the end of the other conduit and comprises, in succession, as viewed from its end opening, a first cylindrical annular portion (5), a convergent frustoconical portion (6) and a divergent frustoconical portion (7) which is connected to a second cylindrical portion. A spherical ring member (10) slidably mounted on male connecting piece (2) engages the cylindrical portion (5) and the convergent frustoconical portion (6) of female connecting piece (3) and is subjected to a longitudinal force, so as to be locked on male connecting piece (2) under the effect of plastic deformation. This device can be used for connecting large diameter pipes used for transporting high pressure fluids, particularly in submarine installations.

12 Claims, 15 Drawing Figures

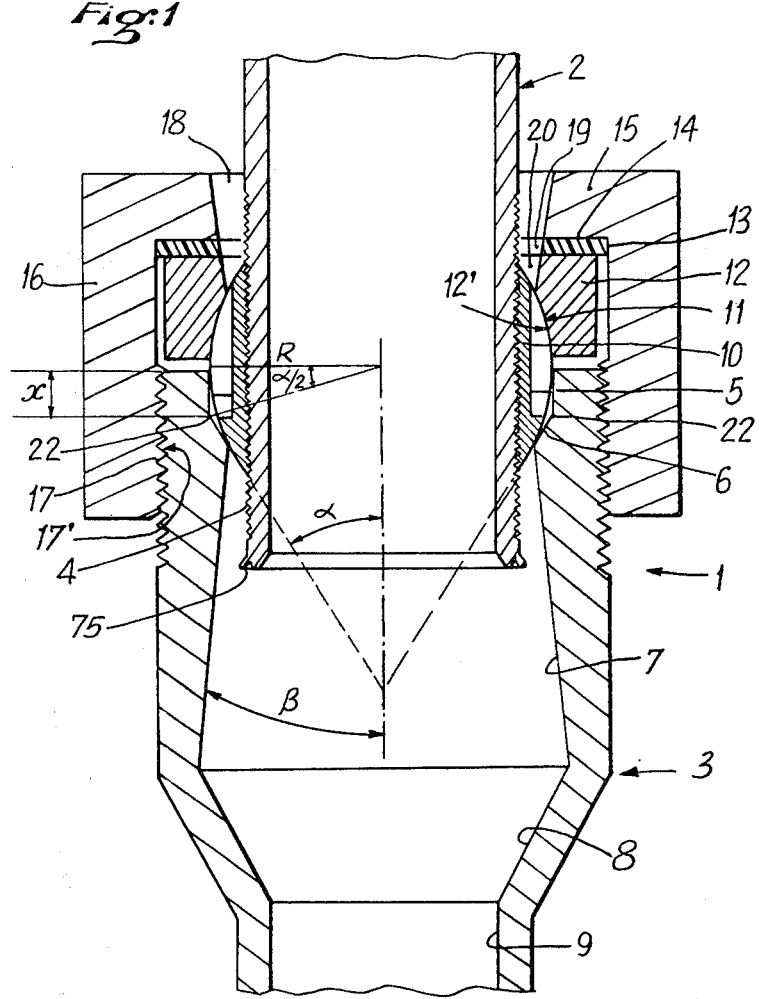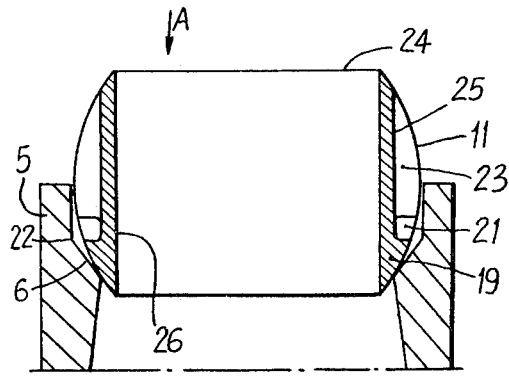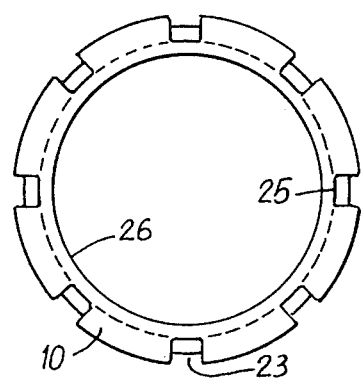

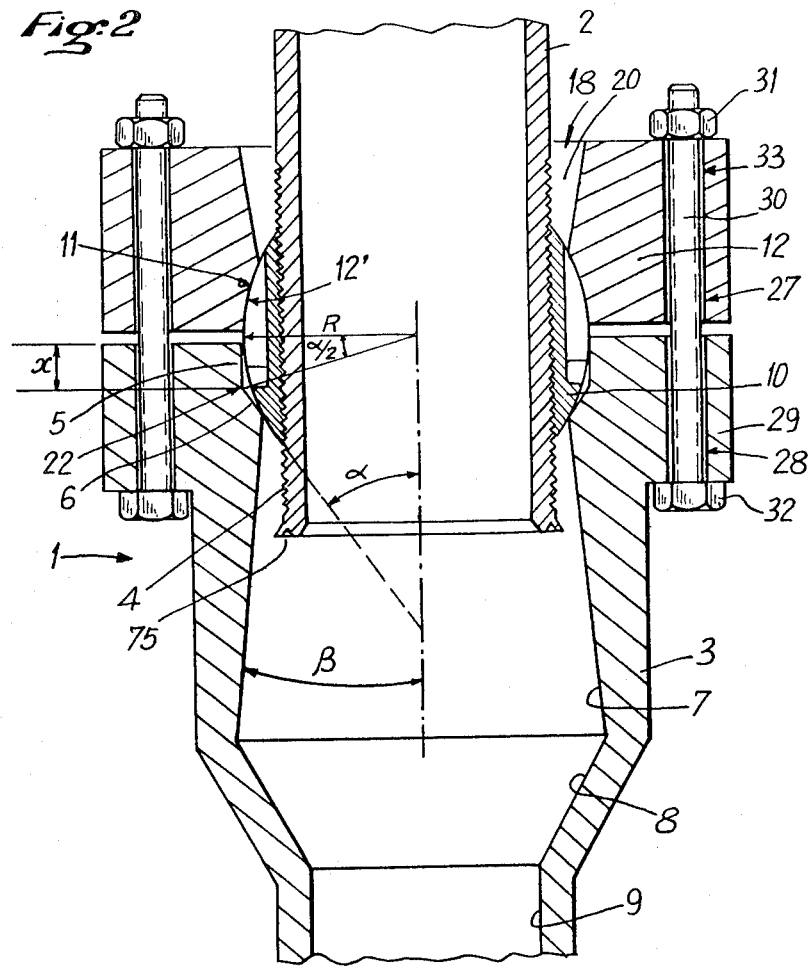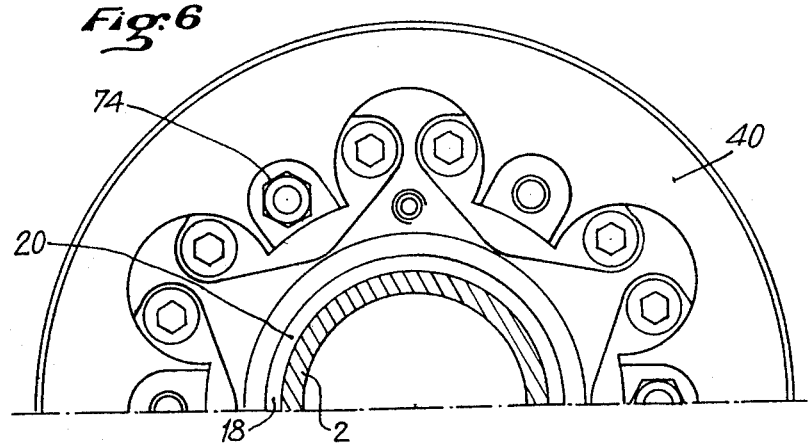

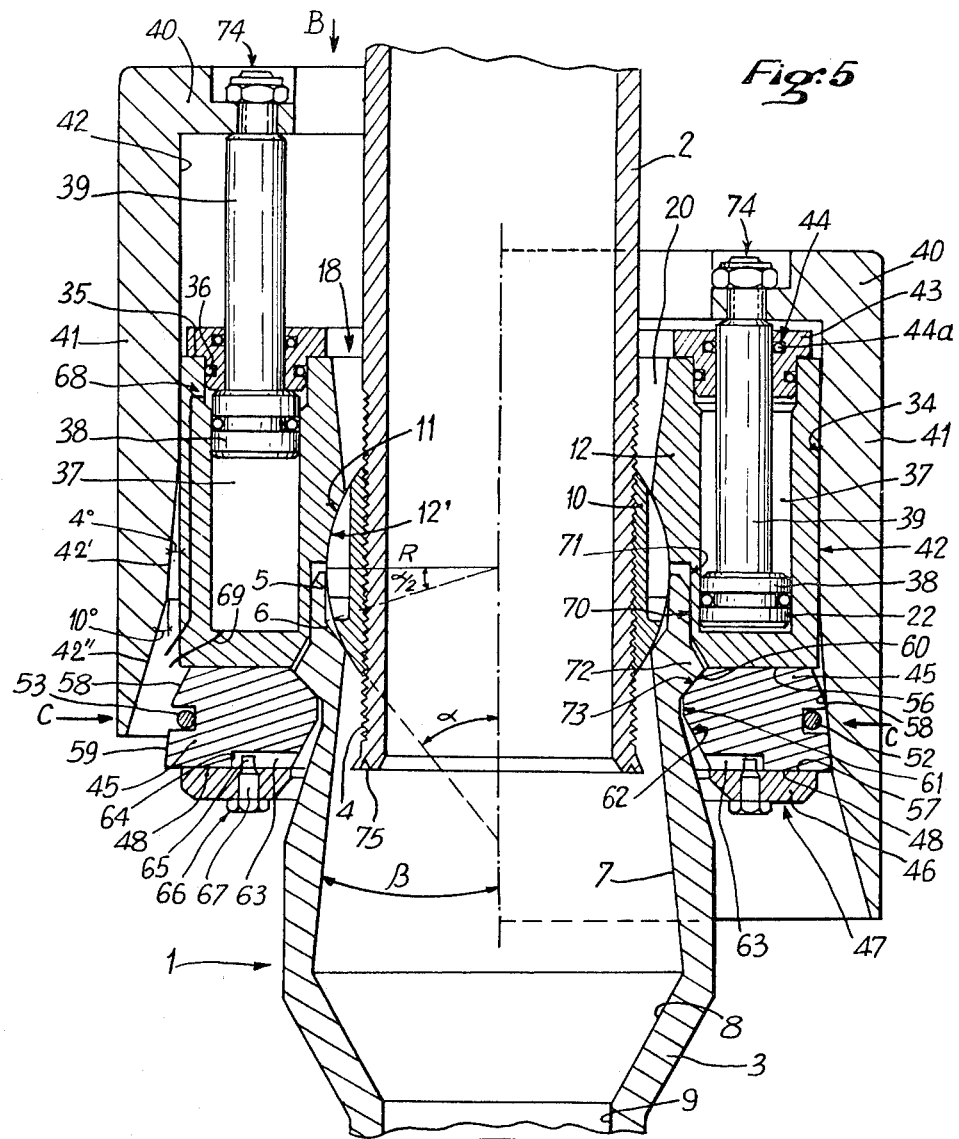
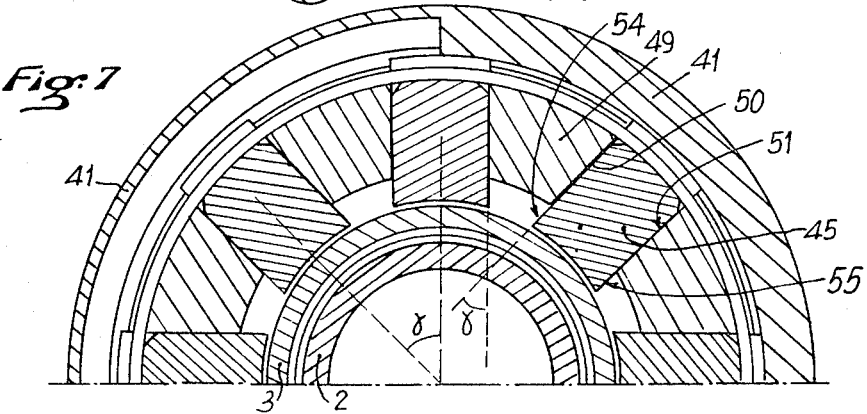

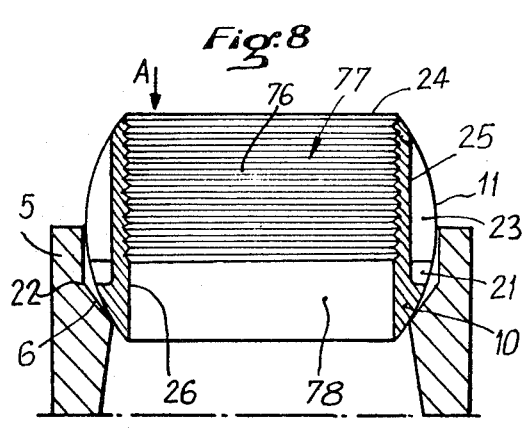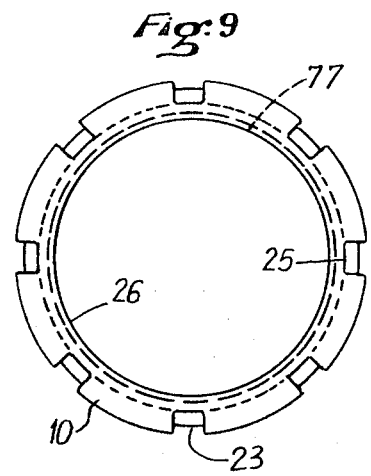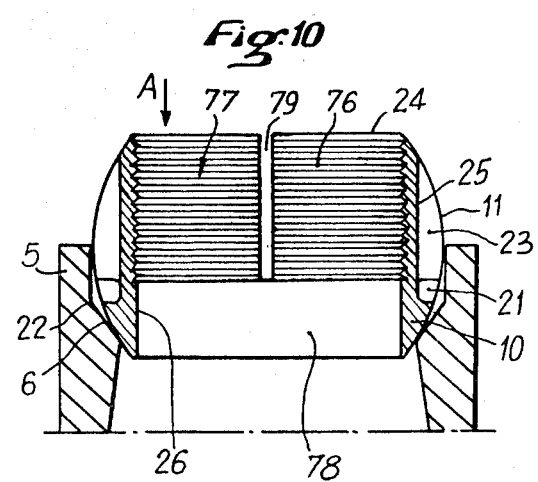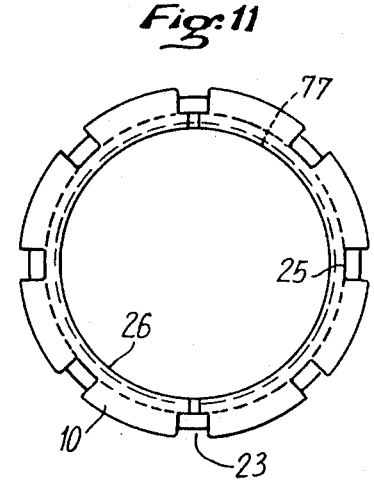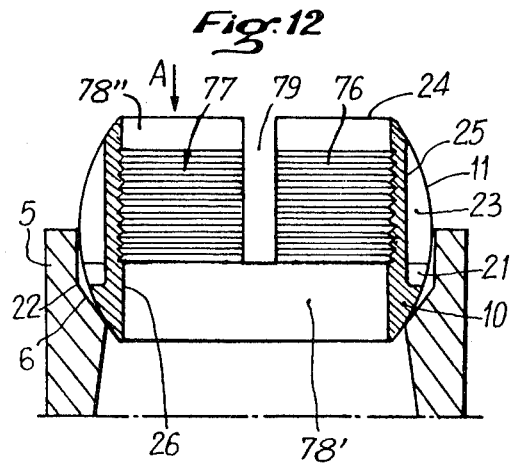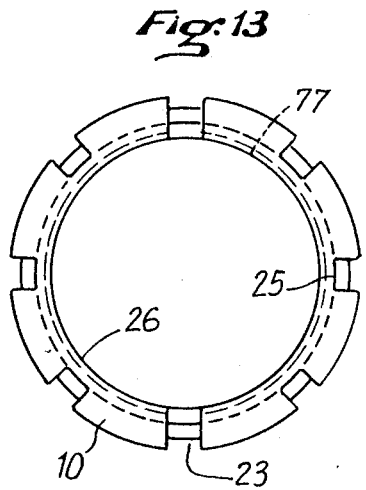

PRESSURE CONDUIT CONNECTING DEVICE

The present invention is related to a connecting device adapted to connect respective ends of two conduits to each other.

Known devices for connecting respective ends of a first conduit and a second conduit comprise a ring member provided at its internal cylindrical periphery with a plurality of circular ridges and adapted to be crimped onto the male end piece of a tube previously provided with a plurality of circular ridges the profile and mutual spacing of which are identical to the profile and spacing of the internal ridges of the ring member. This ring member comprises a frustoconical portion which engages an internal frustoconical portion of an end piece called female end piece integrally mounted on the second conduit, and a further frustoconical portion opposite to the first one, which engages an internal frustoconical portion directed towards the female end piece, said further frustoconical portion being provided on the annular bottom of a nut adapted to be screwed onto a thread defined on the outer periphery of said female end piece.

Since in such known device the ridges provided on the internal periphery of the ring member and the outer periphery of the male end piece have identical sections and are equally spaced from each other, this known connecting device allows the related conduits to be adjusted in the longitudinal direction, however this known device does not allow for any angular deviation; in fact any desired angular deviations of the conduit assembly have to be warranted by the flexibility and the elastically of the conduits; obviously in the case of heavy conduit assemblies having a comparatively large diameter, such angular deviation or "play" is very limited.

When a ring member made of a sufficiently ductile metal is used, the internal periphery of the ring member needs not to be provided with ridges, but may be cylindrical and have a circular cross-section; then, while the ring member is being tightened, this internal periphery will conform to, and firmly engage, the outer periphery of the male end piece. In this case, it is possible to perform a longitudinal adjustment prior to tightening, but no angular adjustment can be achieved.

One essential object of the present invention is to provide a device which overcomes the above drawbacks by using a ring member having an external spherical profile, and by providing in the internal passage of the female connecting piece a space delimited by a frustoconical wall, so as to allow a certain angular displacement or adjustment of the male connecting piece.

With this object, and other objects, in view, the present invention provides a connecting device for connecting respective open ends of two conduits to each other, wherein said conduit ends are provided, respectively, with a male connecting piece having a plurality of annular ridges defined on its outer periphery, and a female connecting piece comprising, in succession starting from the opening of said female connecting piece, a first annular cylindrical portion, a convergent frustoconical portion and a divergent frustoconical portion connected to a second cylindrical portion. A spherically profiled ring member is adapted to slide along said male connecting piece and to engage said first cylindrical portion and said convergent frustoconical portion of the female connecting piece in such a manner that, when submitted to a longitudinal force, said ring member is firmly clutched to said male connecting piece by plastic deformation.

It is a particular object of the invention to provide a connecting device for connecting respective open ends of a first and a second conduit, which comprises:

a male connecting piece affixed to the end of said first conduit and having a plurality of annular ridges defined on its external periphery, a female connecting piece affixed to the end of said second conduit and comprising in succession, starting from the opening of said female connecting piece, a first annular cylindrical portion, an annular convergent frustoconical portion and an annular divergent frustoconical portion connected by one of its ends to a second cylindrical portion the diameter of which is equal to that of the second conduit, said first annular cylindrical portion having a length slightly smaller than the radius of the cylinder multiplied by the tangent of a semi-angle alpha included by a generatrix of the cone defined by said convergent frustoconical portion and the geometrical axis of said convergent frustoconical portion, a ring member having a spherical outer profile, the diameter of which is slightly smaller than the internal diameter of the cylindrical portion of said female connecting piece and the internal cylindrical periphery is provided with clutching means adapted to fix said internal cylindrical periphery to the external cylindrical periphery of said male connecting piece by plastic deformation, the external spherical periphery of said ring member comprising a narrow annular groove centered with reference to the connecting plane defined between the internal first annular cylindrical portion and frustoconical portion of said female connecting piece, and a plurality of longitudinal radial grooves extending between said annular groove and that end of the ring member which is directed toward said male connecting piece, the bottom of said annular groove and of said longitudinal grooves being defined by elements having the same coaxial cylindrical surface of the internal aperture defined by said ring member, and pressure means for exerting on said ring member a longitudinal force in a direction parallel to the axis, from said male connecting piece toward said female connecting piece.

In numerous advantageous embodiments of the invention, said pressure means for exerting on said spherical ring member a longitudinal force are constituted by mechanical means.

According to a first embodiment said mechanical means are constituted by a screw and nut arrangement wherein the screw member is defined by an external helical thread provided on the outer periphery of the end portion of said female connecting piece, while the nut member is defined by an annular piece provided with an internal thread corresponding to said external thread of the screw, said annular piece engaging said spherical ring member through an interposed annular member the inner periphery is defined by a spherical surface portion the radius of which is equal to that of the external periphery of said spherical ring member, said interposed annular member being made of a material adapted to facilitate sliding motions as well as the transmission of the force exerted thereon.

In this embodiment the nut member is generally provided on its external periphery with radial fins which—although their dimensions are comparatively small, are adapted to receive the percussion force of a mass resulting in a locking effect, in a manner known per se.

According to a second embodiment said mechanical means are constituted by an assembly including two collars the first one of which is a stationary collar fixed on the end portion of said female connecting piece while the second collar is a movable collar engaging said spherical ring member in an annular surface having an internal spherical periphery the radius of which is equal to that of the external periphery of said spherical ring member, said two collars being provided with mutually corresponding holes adapted to receive a plurality of equally spaced pins, the respective ends of each one of said pins being provided each with a nut.

In this embodiment the tightening of the nuts can be improvied by means of a so-called "shock-spanner" known per se, whereby the nuts can be positively blocked in an efficient manner.

The two manners of exerting a longitudinal force by mechanical means lead to using for the final blocking either a hammer (or similar tool), or the shock-spanner mentioned herein before, both of these tools being adapted to be used in an air medium or in the presence of a comparatively thin layer of water.

In another embodiment wherein the force is to be exerted under a water layer of considerable depth, said means for exerting the above mentioned longitudinal mechanical force on the spherical ring member are constituted by hydraulic means.

In this particular embodiment, said hydraulic means are constituted by the combination of a ring engaging said spherical ring member by a spherical annular internal portion of said ring, and a cylindrical skirt provided with an annular bottom directed toward said male connecting piece, said bottom having an aperture the diameter of which is greater than the outer diameter of said male connecting piece.

Said skirt rests on a frustoconical portion provided on the outer periphery of said female connecting piece and directed toward said second conduit, while a plurality of wedges are interposed between said frustoconical portion and said skirt, said wedges engaging, on the one hand, said frustoconical portion of the outer periphery of said female connecting piece and, on the other hand, an international frustoconical surface provided within said skirt. The apex angle of the frustoconical surface of the outer periphery of said female connecting piece is wider than this apex angle of said internal frustoconical surface of the skirt.

The above-mentioned ring is slidably mounted within said skirt and connected thereto by at least three hydraulic jacks comprising each a rod one end of which is attached to the annular bottom of the cylindrical skirt, while the respective other ends of said rods are attached each to a piston translationally movable within a cylinder defined within the bulk of said ring.

The internal cylindrical periphery of the spherical ring member is substantially smooth. However when positive attachment is critical, it is advantageous to use ring members wherein a portion of the inner cylindrical periphery is provided with circular ridges having a profile identical to that of the ridges provided on the outer periphery of the male connecting piece. Said circular ridges are formed on that portion of the spherical ring member the outer periphery of which is provided with the above-mentioned longitudinal radial grooves.

In the above indicated embodiments at least one of the longitudinal radial grooves is extended to the internal cylindrical periphery by a slot, for at least part of its width. Said slot establishes the communication between the ridges and the outer periphery of the ring member and thus allows the water which may be captured between the grooves to flow outwardly.

This embodiments is particularly advantageous when it is desired to install on the sub-marine ground conduits or pipes having comparatively large dimensions, in which fluids have to be displaced under high pressure.

The invention will now be described in a more detailed manner with reference to the appended drawing which is given by way of illustration, but not of limitation. In the drawing:

FIG. 1 shows a connecting device comprising a spherical ring member and a screw and nut type assembly.

FIG. 2 shows a connecting device comprising a spherical ring member and a collar and pin type assembly.

FIG. 3 shows an axial section of a spherical ring member.

FIG. 4 is an end view of the spherical ring member.

FIG. 5 shows a connecting device comprising a spherical ring member an hydraulic tightening or locking means.

FIG. 6 is an end view of the connecting device shown in FIG. 5.

FIG. 7 is a sectional view AA of the connecting device of FIG. 5.

FIG. 8 shows a spherical ring member provided with internal ridges.

FIG. 9 is an end view of the ring member shown in FIG. 8.

FIG. 10 represents a ring member provided with internal ridges and slots extending the external longitudinal grooves and having a width smaller than that of said grooves.

FIG. 11 is an end view of the ring member shown in FIG. 10.

FIG. 12 shows a ring member provided with internal ridges and slots extending the external longitudinal grooves, and having the same width as the latter.

FIG. 13 is an end view of the ring member shown in FIG. 12.

FIG. 1 shows an axial section of a connecting device comprising a spherical ring member and tightening means of the screw and nut type.

Figure 14:
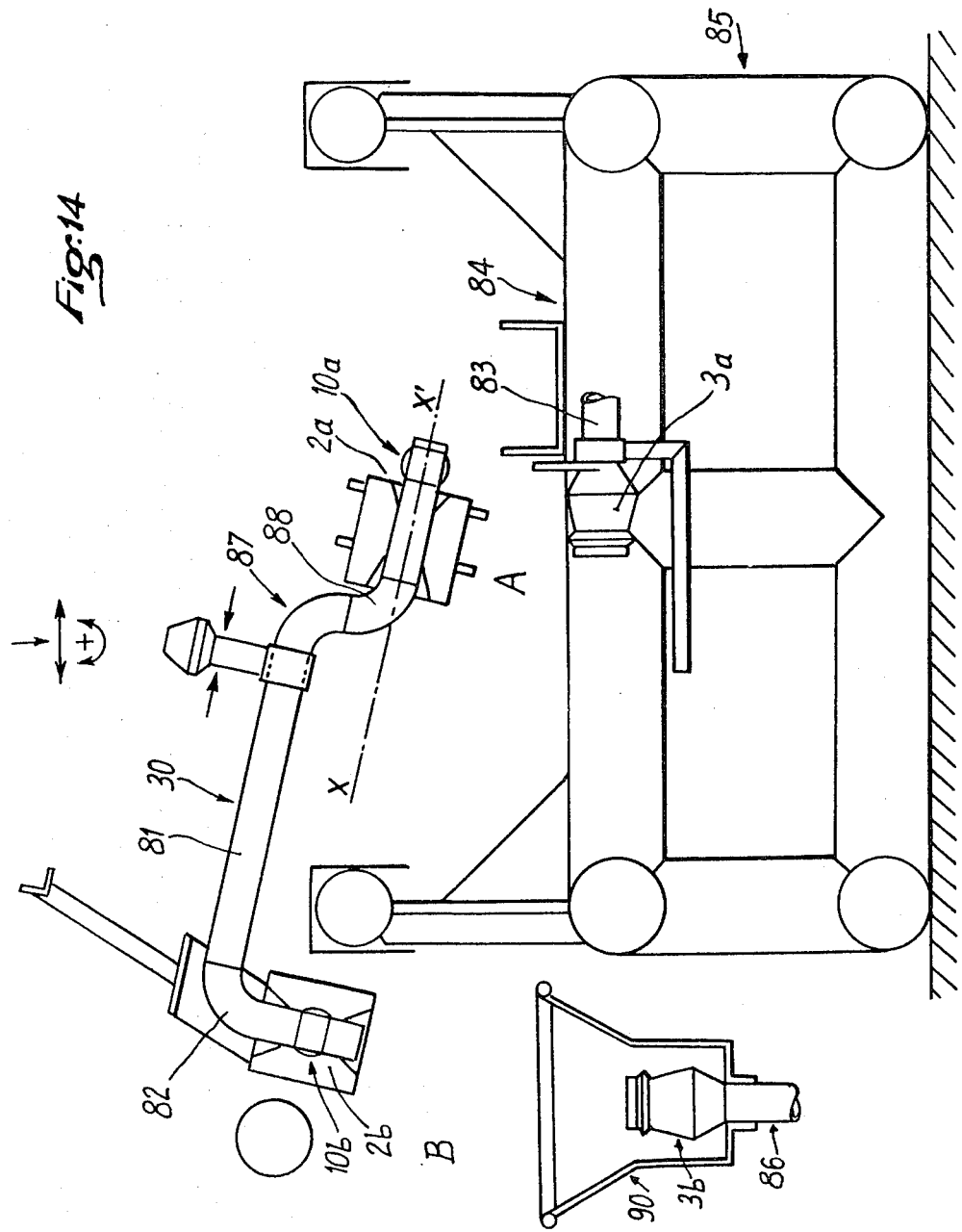
FIG. 14 shows an intermediate phase of operation during the establishment of an installation comprising two connecting devices.

This connecting device 1 includes a male connecting piece 2 fixed to the end of a first conduit (not shown), and a female connecting piece 3 fixed to the end of a second conduit (not shown).

The outer periphery of male connecting piece 2 is provided with annular ridges, such as shown at 4, having identical profiles and being equally spaced from each other. Female connecting piece 3 comprises, starting from its end opening, and in succession, a first cylindrical portion 5, a convergent frustoconical portion 6 and a divergent frustoconical portion 7, these portions being coaxial to each other.

Frustoconical portion 7 is connected by a frustoconical connecting portion 8 to a second cylindrical portion 9 the inner diameter of which is equal to that of the associated second conduit.

Furthermore the connecting device comprises a ring member 10 having an outer spherical periphery 11, which prior to the definite connection position of the device is coaxial to the male connecting piece 2 and slidably movable along the same.

Cylindrical portion 5 of connecting piece 3 has a radius (R) slightly greater than the radius of the radius of the external spherical surface of ring member 10. Frustoconical portion 6 as a semi-apex angle alpha and thus the length x of cylindrical portion 5 of connecting piece 3 is slightly greater than the value (R tg($\alpha$/2).

Prior to the effective connection of the connecting pieces, when connecting piece 2 penetrates partially connecting piece 3, ring member 10 engages, on one hand, frustoconical portion 6 of connecting piece 3 in a narrow annular zone and, on the other hand, an annular piece 12 the major portion of the internal periphery of which is constituted by a spherical annular surface 12' having the same radius as the external spherical profile (or surface) 11 of ring member 10.

Said annular piece 12 engages a washer 13 the surfaces of which have a very low friction coefficient (said surfaces being preferably constituted by a self-lubricating plastic material), which washer engages in turn a stop member 14 constituted by a ring portion 15 integral with a nut 16. Said nut 16 is provided with an internal thread 17 the characteristics of which correspond to those of an external thread 17' provided on the outer periphery of female connecting piece 3.

The magnitude of the apex angle beta of frustoconical portion 7 is at least equal to the maximum value of the angle which the respective axes of connecting piece 2 and 3 are apt to define between each other.

Ring portion 15 integral with nut 16 comprises an orifice 18 which may be cylindrical or frustoconical in shape and the dimensions of which are selected in such a manner that connecting piece 2 can be inserted therein and the axis of said connecting piece 2 can be inclined under an angle beta with reference to the axis of connecting piece 3.

Annular piece 12 and washer 13 are provided with orifices 19 and 20 which allow connecting piece 2 to be mounted with a possible inclination of the axis of connecting piece 2 under an angle beta with reference to the axis of connecting piece 3.

When nut 16 is displaced by screwing on connecting piece 3 it exerts on ring member 10 a force in a direction parallel to the axis of connecting piece 3. This force results on the one hand in a tight engagement between ring member 10 and frustoconical portion 6 and, on the other hand, in fixing ring member 10 on connecting piece 2 by plastic deformation of the internal periphery of ring member 10 under the effect of the external periphery of connecting piece 2 due to grooves 14 provided on said periphery.

FIG. 3 shows a median section of ring member 10 having an external spherical profile 11, and FIG. 4 shows this ring member 10 as viewed from the end thereof according to arrow A in FIG. 3. The external spherical periphery 11 of ring member 10 comprises a narrow annular groove 21 substantially centered on the plane 22 of the connection of internal annular cylindrical portion 5 and internal frustoconical portion 6 of female connecting piece 3. Outer periphery 11 further comprises a plurality or radial longitudinal grooves such as 23 extending between annular groove 21 and the end 24 of the ring member which is directed toward the male connecting piece. Annular groove 21 and longitudinal grooves such as 23 have bottom surfaces which present the same coaxial cylindrical surface area as that of the internal passage, or bore, 26 of ring member 10.

FIG. 2 is an axial section of a connecting device comprising a spherical ring member and adapted to be tightened by means of a collar and bolt assembly.

This connecting device 1 comprises a male connecting piece 2 attached to one end of a first conduit (not shown) and a female connecting piece 3 attached to one end of a second conduit (not shown).

Male connecting piece 2 is provided on its external periphery with a plurality of annular ridges such as 4 having identical profiles and being equally spaced from each other.

Female connecting piece 3 comprises in succession, starting from its end opening, a cylindrical portion 5, a convergent frustoconical portion 6 and a divergent frustoconical 7, which three portions are coaxial to each other.

Frustoconical portion 7 is connected through a frustoconical connecting portion 8 to a cylindrical portion 8 the inner diameter of which corresponds to that of the second conduit.

The connecting device furthermore comprises a ring member 10 having an outer spherical profile, or periphery 11, which ring member, in a condition prior to the establishment of the connection, is coaxial to male connecting piece 2 and slidably mounted thereon so as to be displaceable in an axial direction along said male connecting piece.

Cylindrical portion 5 of connecting piece 3 has a radius R slightly greater than the radius of spherical outer periphery of ring member 10: frustoconical portion 6 has a semi apex angle alpha, and the length x of cylindrical portion 5 of connecting piece 3 is slightly greater than R tg($\alpha$/2).

In a condition prior the establishment of the connection wherein connecting piece 2 penetrates partially connecting piece 3, ring member 10 engages, on the one hand, frustoconical portion 6 of connecting piece 3 in a narrow annular zone and, on the other hand, annular piece a portion of the inner periphery of which is constituted by a spherical annular surface 12' having a radius equal to that of the external periphery 11 of ring member 10.

FIGS. 3 and 4 illustrate the essential characteristics of ring member 10.

Annular piece 12 as shown in FIG. 2 forms a collar the peripheral portion of which is provided with a plurality of holes such as 27 equally spaced about the geometrical axis, said holes being aligned, and having the same diameter as, a plurality of holes such as 28 provided in a collar 29 integral with connecting piece 3 and surrounding the opening or bore of the latter.

Bolts or pins 30 provided with nuts 31 and 32 screwed on the respective ends thereof are mounted in holes 27 and 28 having equal diameters.

Collar 12 has an opening or bore 18 defined, in part, by an annular portion 12' constituting the spherical envelope 11 of ring member 10, the remaining part of bore 18 being constituted by a cylindrical of frustoconical conduit 20 which is shaped in such a manner that it enables connecting piece 2 to be inserted and the axis thereof to be inclined under an angle beta with reference to the geometrical axis of connecting piece 3. The apex angle of frustoconical portion 7 is at least equal to twice the maximum value of angle beta which can be formed between the respective axes of connecting pieces 2 and 3.

Whe the nuts 31 and 32 associated to bolts 30 are being screwed in place collars 25 and 19 are pushed toward each other and thus cause ring member 10 to be subjected to a force acting in a direction parallel to the axis of connecting piece 3. Under the effect of said force ring member 10 tightly engages frustoconical portion 6 and furthermore said ring member is fixed onto connecting piece 2 by plastic deformation of the inner periphery of ring member 10 due to grooves 14 provided on said outer periphery.

FIG. 5 is an axial section of a connecting device provided with a ring member having a spherical periphery and with hydraulic tightening means.

Such connecting device 1 comprises a male connecting piece 2 fixed on the end of a first conduit (not shown) and a female connecting piece 3 fixed on the end of a second connecting piece (not shown).

Male connecting piece 2 is provided on its external periphery with a plurality of annular ridges, such as 4, which have identical profiles and which are regularly spaced from each other.

Female connecting piece 3 comprises in succession, starting from its orifice, a cylindrical portion 5, a convergent frustoconical portion 6 and a divergent frustoconical portion 7, said three portions being coaxial to each other. Frustoconical portion 7 is connected through a connecting frustoconical portion 8 to a cylindrical portion 9 the inner diameter of which corresponds to that of the second conduit.

The connecting device furthermore comprises a ring member 10 having an outer spherical periphery 11 which, in a condition prior to the establishment of the connection, is coaxial to male connecting piece 2 and slidably mounted so as to be displaceable along said connecting piece.

Cylindrical portion 5 of connecting piece 3 has a radius R slightly greater than that of the external spherical periphery of ring member 10; frustoconical portion 6 has a semi-apex angle alpha, and the length x of the cylindrical portion 5 of connecting piece 3 is slightly greater than the value R tg($\alpha$/2).

In a condition prior to the establishment of the connection, wherein connecting piece 2 partially penetrates connecting piece 3, ring member 10 engages, on the one band, frustoconical portion 6 of connecting piece 3 in a narrow angular zone and, on the other hand, an annular piece 12 a portion of the inner periphery of which is constituted by a spherical annular surface 12' the radius of which is equal to that of the external periphery 11 of ring member 10.

FIGS. 3 and 4 illustrate the main characteristics of said ring member 10.

As shown in FIG. 5 annular piece 12 constitutes a collar having a lateral external cylindrical profile and comprising on its surface 35 directed toward connecting piece 1 a plurality of regularly spaced orifices 36 of cylindrical cavities 37 each one of which encloses a translationally movable piston 38 attached to one end of a rod 30 the other end of which is fixed to an annular bottom 40 integral with a cylindrical skirt 41, said skirt being translationally movable by sliding with its internal cylindrical wall 42 on the lateral outer cylindrical periphery 34 of collar 12.

Orifices 36 are provided with plugs 43 each one of which is removably fixed in a corresponding orifice and provided with an interposed seal, or gasket. Each plug has an orifice 44 provided with a seal 44a, whereby rod 39 of piston 38 is allowed to pass and to be guided slidably in a fluid-tight manner.

The inner cylindrical wall 42 of each cylindrical skirt 41 is extended by a frustoconical annular portion 42' which constitutes a clamping or tightening portion having a semi apex angle of 4°, said frustoconical portion 42' being connected to a frustoconical annular portion 42" which constitutes an interlocking bearing surface having a semi apex angle of 10°.

Planar annular surface 35 of collar 12, which is directed toward connecting piece 3 engages a plurality of wedges 45 regularly spaced about the geometrical axis of connecting piece 3. Said wedges are maintained in place by a piece 46 constituted by an annular element having planar surfaces 47 and 48 and having an inner diameter sufficiently large so as to allow said element to be mounted from the end of connecting piece 3, said element being provided with with lug-like members 49 (FIG. 7) the number of which is equal to the number of wedges 45, and which constitute in combination with surface 48 of annular element 46 compartments delimited by lateral opposed parallel walls 50, 51, said compartments being adapted to receive wedges 45; wedges 45 furthermore are maintained by an elastic annular member 52 mounted in a groove 53 provided in an external surface of each wedge.

Lug-like members 49 are intersected by a plane, perpendicular to the axis of connecting piece 3 so as to define quadrangular sections two opposed sides of which are straight lines defining between themselves an angle alpha which is equal to 360° divided by the number of wedges, as illustrated in FIG. 7.

FIGS. 5 and 7 illustrate each wedge 45 delimited by two parallel surfaces 54 and 55 separated by a metal wall thickness slightly smaller than the distance between walls 50 and 51 of the lug-members located on either side of the related wedge 45, by two parallel surface 56 and 57 perpendicular to the axis of connecting piece 3, by an external periphery constituted by two elements 58 and 59 having frustoconical surfaces which diverge in the direction from connecting piece toward connecting piece 3 and comprising in succession a semi apex angle of 10° as far as element 58 is concerned, a semi apex angle of 4° as far as element 59 is concerned; each wedge being further delimited by an internal periphery constituted, in succession, as viewed from connecting piece 2 in the direction of connecting piece 3 by three successive elements having annular surfaces, to wit: frustoconical element 60 diverging in the direction from connecting piece 3 toward connecting piece 2, cylindrical element 61 and frustoconical element 62 diverging in the direction from connecting piece 2 toward connecting piece 3.

The surface 57 of each wedge 45 which is directed toward connecting piece 3 and thus toward annular element 46 is provided with a groove 63 which extends radially with reference to the geometrical axis of connecting piece 3. Radial grooves 63 are open at the inner frustoconical periphery 62 of wedge 45 and are interrupted in the opposite direction by a bottom wall 64 chich constitutes a stop-member for a pin 65 translationally movable in groove 63 and integral with annular element 46.

As shown in FIG. 5 pin 65 is constituted by the extension of the shaft of a bolt 66 screwed into a threaded hole 67 through annular element 46, said extension protruding beyond surface, or wall, 48.

The left hand portion of FIG. 5 shows a sectional view.

Conduits 68 and 69 connected to a pressurized hydraulic fluid source open into each end of the cylindrical cavities or cylinders 37, piston 38 in cylinder 37 thus functioning as a double-acting piston submitted to a pressure differential which acts either on one of its surfaces or the other.

The left hand portion of FIG. 5 shows a sectional view of the connecting device in its disconnected position, piston 38 being located in its extreme position toward connecting piece 2, while the right hand portion of FIG. 5 is a sectional view of the connecting device in its locking position, piston 38 being near its extreme position toward connecting piece 3.

As shown in FIG. 5 connecting piece 3 has an outer periphery which comprises, starting from its orifice: a cylindrical portion 70 having a diameter slightly smaller than that of a cylindrical portion 71 of the inner periphery of annular piece 12, said cylindrical portion 71 being located adjacent the annular cylindrical portion 12' of annular piece 12 which rests on the spherical annular portion 11 of ring member 10. The diameter of cylindrical portion 71 is greater by several centimeters than diameter 2R of spherical ring member 10. Cylindrical portion 70 is extended as shown in FIG. 5 by a divergent frustoconical portion, the arrangement being such that when the connection is established angular piece 12 does not engage connecting piece 3, and, more particularly, does not engage an annular projection 72 extending from cylindrical portion 70.

Said annular projection 72 is delimited in the direction of the second conduit to which connecting piece 3 is attached, by a frustoconical bearing surface 73 converging in the above-mentioned direction. Frustoconical surface 73 acts as a bearing surface for annular element 60 in respect of wedges 45. The semi apex angle of frustoconical portion 73 is equal to the semi apex angle of annular element 60. In the embodiment shown in FIG. 5 this semi apex angle has a value of 45°.

FIG. 6 shows the connecting device as viewed in the direction indicated by arrow B in FIG. 5. FIG. 6 shows a sectional view of connecting piece 2, the internal and external profiles of the annular bottom 40 and bolts such as 74 by means of which the rods (such as 39) of the pistons such as 38 are fixed to said annular bottom 40. FIG. 6 furthermore shows bore 18 and frustoconical profile 33 allowing connecting piece 2 to pass through collar 12. Elements 38, 39 and 12 are not shown.

FIG. 7 is a half-sectional view of the connecting device taken along line C—C in FIG. 5. Similarly to the representation of FIG. 5 the left hand portion of FIG. 7 shows the connecting device in the disconnected condition, while the right hand portion of FIG. 7 shows the device in the connected position. The Figure shows wedges 45 located in compartments having parallel opposed lateral walls 50 and 51. These compartments are separated by lug-like members 49 having quadrangular sections as shown in FIG. 7, with two opposed sides being constituted by a straight lines forming an angle equal to 360° divided by the number of wedges, while the two remaining sides have the configuration of arcs of circles.

FIG. 7 also shows in section parts of the cylindrical skirt 41, connecting piece 2 and connecting piece 3.

As shown in the Figures in these three embodiments according to FIGS. 1, 2 and 5, the end of connecting piece 2 is deformed such as at 75; such deformation, which is obtained by means of a hammer, or the like, results in a flaring of the end of the connecting piece, and is effected after ring member 10 has been mounted on connecting piece 2.

FIGS. 8 and 9 show in longitudinal median section and in a planar view, respectively, a ring member 10 hving an outer spherical periphery; in this embodiment the ring member is provided on a portion 76 of its internal cylindrical periphery 26 with a plurality of circular ridges 77 having the same profile as the ridges provided on the outer periphery of the male connecting piece. In the present embodiment ridges 77 are formed on the internal portion 76 of the ring member the outer periphery of which is provided with longitudinal grooves 23.

Whichever the metal constituting the ring member 10 may be—stainless steel, bronze or any other alloy convenient for submarine use—the ridges provide for a better locking of the ring member on the male connecting member than that which could be achieved by using a cylindrical periphery without ridges. On the other hand the sealing contact between the ring member and the male connecting piece is ensured by engagement of the cylindrical portion 78 which matches cylindrical portion 77 provided with ridges, said cylindrical portion 78 being applied on the outer periphery of the male connecting piece which is provided with ridges.

FIGS. 10 and 11 represent in longitudinal median section and in planar view, respectively, a ring member 10 a portion 76 of the inner periphery 26 of which is provided with ridges 77, which inner portion 76 of the ring member constituting that portion to which corresponds, on the outer periphery, the zone provided with longitudinal grooves 23. Two of these grooves 23 are extended by a slot 79 to the internal portion 26, said slot 79 having a width smaller than that of groove 23.

FIGS. 12 and 13 are views similar to those of FIGS. 10 and 11, showing slots 79 the width of which is equal to that of the ridges 23.

In FIG. 13 portion 76 of the inner periphery 26 of ring member 10, which is provided with circular ridges 77, is delimited between two cylindrical portions 78', 78" having smooth surfaces.

ASSEMBLING AND LOCKING OF THE CONNECTING DEVICE

Prior to the establishment of the connection a male connecting piece 2 and a female connecting piece 3 are fixed e.g. by welding on respective ends of two conduits to be connected to each other.

Various annular elements are then put into place on the male connecting piece, to wit: elements 12, 13 and 16 as far as the embodiment of FIG. 1 is concerned, element 12 as regards the embodiment of FIG. 2, and element 12 with pistons 38, rods 39 and annular bottom 40 with cylindrical skirt 41, as far as the embodiment of FIG. 5 is concerned. The spherical ring member is then slidably mounted, whereafter the end of the connecting piece is deformed so as to present the flared portion 75.

The wedges 45 maintained by annular element 46 and lug members 49 fixed thereto, as well as by electric ring 52 are then put into place on the female connecting piece in such a manner that they rest on portion 73.

The two connecting pieces are then brought together and connecting piece 2 is made to penetrate connecting piece 3 until ring member 10 rests on frustoconical portion 6.

It is then possible to adjust the position of connecting piece 2 longitudinally in connecting piece 3 by slidably displacing connecting piece 2 in spherical ring member 10 and by angularly orienting said spherical ring member on its frustoconical portion, in such a way that the locking of spherical ring member 10 on connecting piece 2 and the locking of said ring member on its frustoconical portion with a view to ensuring a tight connection are carried out by means of the hydraulic device only after an optimum adjustment of the two connecting pieces with reference to each has been obtained, which is advantageous in that the stresses acting on the conduits are thereby substantially reduced; it should be remembered that these stresses very often bring about cracks in the metal parts whereby corrosion may be initiated.

Orifice 68 is then connected to the hydraulic pressure fluid source, thus causing the pistons 38 to be displaced toward connecting piece 3.

Frustoconical portion 43 of skirt 41 engages frustoconical portion 59 of wedges 45. These portions form an angle of 4° with the axis of connecting piece 3. Furthermore, wedges 45 engage by their inner frustoconical portion 60 frustoconical portion 73 of connecting piece 3, as well as surface 12′ of annular piece 12 directed toward connecting piece 3 by means of the planar surface 56 prependicular to the axis.

The combination of the forces acting on wedges 45 produces forces acting between annular piece 12 and connecting piece 3 to magnitude of which represents 5 to 6 times the magnitude of the total force produced by cylinders 37 and pistons 38, taking into account the friction coefficient.

Since the area of the contact surface of 4° between skirt 41 and wedges 45 is substantially smaller for the limit value of the sliding angle, which equals aabout 6°, the tightening or locking action thus achieved is stable and non-reversible. Loosening or unlocking can only be effected by reversing the action of the hydraulic fluid on cylinders 38 by means of orifices 69.

For many applications, especially on the ground or in the open air, once the longitudinal and angular adjustment has been effected to substantial stress will act on the elements of the interconnected conduits, and during the operation of establishing the connection the spherical ring member having a smooth inner cylindrical periphery will be fixed satisfactorily on the outer periphery of the male connecting piece, which is provided with ridges.

With a view to providing for most general conditions of utilisation, spherical ring member having on their inner cylindrical periphery circular ridges the profile of which is identical to that of the ridges provided on the outer periphery of the male connecting member should be used, whichever the metal of said ring member may be (stainless steel, bronze or any other alloy convenient for submarine applications).

When using members of this kind the highly pressurized water remains isolated, during the establishment of the connection, within the annular spaces delimited by the ridges provided on the two ralated elements. When this water is subsequently made to communicate—even though with some difficulty—with a space wherein the pressure is lower, the volume of said water will increase, which might have deleterious effects on the tightness of the connection. With a view to overcoming this drawback all the ridges are arranged to communicate with the external periphery of the ring member through the above-mentioned slots which constitute extensions of the longitudinal grooves previously provided on the outer surface of the ring member.

When using ring members having internal ridges the fixation is ensured by the portion provided with ridges, while the tightness is ensured by the contact between the internal cylindrical portion and the external periphery of the connecting piece.

The stable locking achieved under the action of a hydraulic fluid and allowing the connecting device to be longitudinally and angularly adjusted enables the connecting device shown in FIG. 5 to be used in submarine installations located at considerable depth.

After unlocking a new angular adjustment may be effected; however no new longitudinal adjustment will be possible; at any rate it is possible to disassemble and recover the various elements of the conduit installation in a simple and easy manner.

INSTALLATION OF A DISCONNECTABLE CONNECTING ASSEMBLY

A connecting device such as those described with reference to FIGS. 1 to 13 allows a first conduit element to be connected to a second conduit element, taking into account, on the one hand, a maximum angular installation, is comprised between 10° and 20° and, on the other hand, a longitudinal adjustment which may be of a magnitude in the order of several decimeters, by slidable displacement of the spherical ring member 10 along the associated connecting piece 2.

The connection can subsequently be disassembled whereby the conduit elements can be removed in the reverse order of the mounting operation while it is practically impossible to remove a given element independently of the others with a view to repairing or replacing the same.

The installation described with reference to FIGS. 14 and 15 allows a given element of the conduit assembly to be removed without removing the adjacent elements located on either side thereof.

Such installation comprises two connecting devices, to wit: one connecting device 1a at A and one connecting device 1b at B, the respective two male connecting pieces 2a and 2b are fixed to both ends of a tubular element 80 including a rectilinear conduit element 81 extended by a right angled crank portion 82.

The female connecting pieces 3a and 3b associated, respectively, to connecting pieces 1a and 1b are mounted, respectively, on the end of the first conduit and on the end of the second conduit, these ends forming a right angle with respect to each other.

Figure 15:
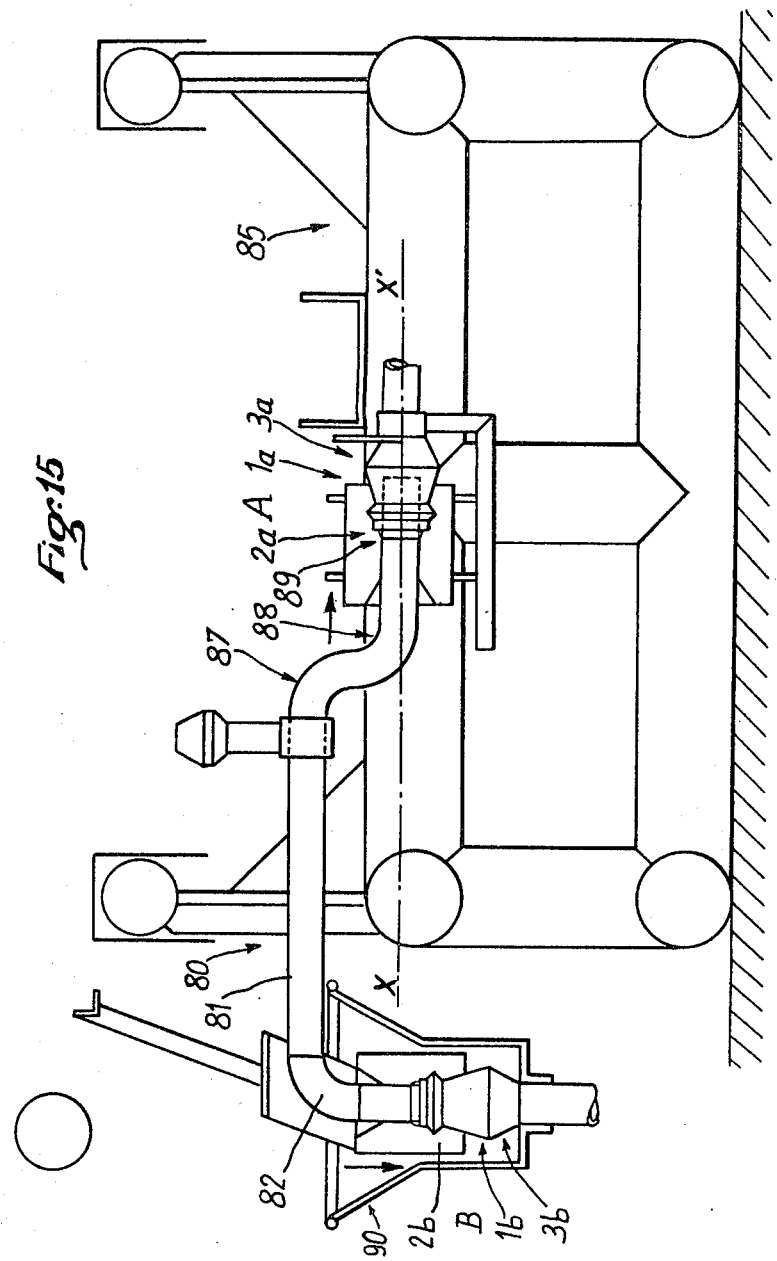
FIG. 15 shows the installation of FIG. 14 after the establishment of the connections.

FIGS. 14 and 15 show such a connecting installation, which connects the end of a first conduit 83 attached to a frame 84 of a submarine station 85 resting on a submarine soil. Said horizontal first conduit 83 is connected to the female connecting piece 3a. The vertical second conduit 86 is connected to the female connecting piece 3b.

In the installation shown in FIGS. 14 and 15 rectilinear conduit element 81 is provided at its end extended by a right-angled crank portion 82 with two successive crank portions 87 and 88 arranged in such a manner that the axis XX of the final orifice 89 is located substantially in the median plane of the spherical ring member 10b of male connecting member 2b fixed on the orifice of crank portion 82.

At B a funnel 90 is provided with a view to facilitating the preliminary mounting operations.

FIG. 14 shows the connecting installation during mounting or disassembling operations, the latter being effected in the reverse order of said mounting operation.

Since the end portions of conduits 83 and 86 are perpendicular to each other with a tolerance of 10° to 20° and are separated, in the installation, by a predetermined distance which corresponds, with a tolerance of several decimeters, to the nominal distance of the installation, the mounting operation comprises the following successive steps:

positioning of male connecting piece 2a in female connecting piece 3a;

adjusting ring member 10a on connecting piece 2a in such a manner that connecting member 2b is oriented with reference to connecting member 3b in an accurate way by rotation about the geometrical center of 10a;

mounting of 2b in 3b and positioning 10b along 2b in such a manner that conduit element 81 assumed a position as near as possible to the horizontal;

locking or tightening both connecting devices 1a and 1b, using the mechanical or hydraulic means provided to this end.

FIG. 15 shows the connecting installation after the establishment of the connection.

The installation shown in FIGS. 14 and 15 and described hereinabove constitutes one example of the practical application of the connecting devices described herein-before with reference to FIGS. 1–13.

The invention is not limited to the embodiments shown and described herein-above; numerous modifications and variants may be envisaged by those skilled in the art within the spirit and scope of the invention as defined in the appended claims.

What is claimed is:

1. A connecting device for connecting to each other respective ends of a first conduit and a second conduit, the connecting device comprising:

a tubular cylindrical male connecting piece fixed to the end of said first conduit, said male connecting piece having an outer periphery, a tubular female connecting piece fixed to the end of said second conduit and having an open end facing toward said first conduit, said female connecting piece comprising, in succession, starting from the open end of said female connecting piece, a first annular portion, a convergent frustoconical annular portion, and a divergent frustoconical annular portion, a ring member having an outer spherical periphery adapted to engage a seat constituted by said convergent annular portion, the outer diameter of said spherical periphery being slightly smaller than the inner diameter of said first annular portion of the female connecting piece, said ring member having an internal periphery, the outer spherical periphery of said ring member having a plurality of radial longitudinal grooves extending over a major portion of the ring member between a plane perpendicular to the axis of said ring member and passing through said ring member, and the end thereof which faces toward the first conduit, said longitudinal grooves each having a bottom constituted by substantially identical surfaces coaxial to the internal periphery of said ring member, said external spherical periphery of said ring member having a narrow annular groove centered on a plane which delimits said radial longitudinal grooves in the direction of said female connecting piece, means for compressing said ring member radially in response to a longitudinal force substantially parallel to the axis of said ring member in the direction from said first conduit toward said second conduit, and cooperating means on at least one of the internal periphery of said ring member and the outer periphery of said male connecting piece for fixing said ring member to said male connecting piece by plastic deformation of at least one of said peripheries.

2. The device of claim 1, wherein said plane delimiting said radial longitudinal groove in the direction of said female connecting piece corresponds to a plane defined by a junction between said first annular cylindrical portion and said convergent frustoconical portion of said female connecting piece.

3. The device of claim 1 wherein said means for compressing said ring member radially comprises, a screw-and-nut assembly, said screw being defined by a helical thread on the external periphery of an end portion of said female connecting piece, said nut being defined by a ring piece having a shoulder, and an internal thread corresponding to the thread of said screw, and an annular element having an internal spherical surface having the same radius as the external periphery of the spherical ring member, and disposed between said spherical ring member and said shoulder of said ring piece.

4. The device of claim 3 further comprising, a low friction washer between said shoulder of said nut and said annular element.

5. The device of claim 1, wherein said means for compressing said ring member radially comprises a first collar fixed to the end of said female connecting piece, a second collar opposed to the first collar and having an annular spherical internal surface engaging said spherical ring member, said annular spherical surface having a radius which is equal to that of the outer periphery of said ring member, and nut and bolt means for pulling the second collar toward the first collar to compress the ring member radially.

6. The device of claim 1, wherein said means for compressing said spherical ring member radially comprises hydraulic means, said hydraulic means comprising an annular piece having an internal spherical surface engaging said spherical ring member, a plurality of radially moveable wedge elements on said annular piece, said wedge elements engaging a shoulder on the exterior of the female connecting piece which faces away from the open end of the female connecting piece, a skirt surrounding said annular piece, said skirt having a cam surface, and hydraulic means for moving said skirt to a position in which the cam surface forces said wedges against said shoulder to move said annular piece axially to compress said spherical ring member radially.

7. The device of claim 6, wherein said cam surface of said skirt comprises a first surface for moving said wedges inwardly, and a second surface for locking the wedges against outward movement.

8. The device of claim 1, wherein the means for fixing the internal periphery of the spherical ring member to the external periphery of said male connecting piece by plastic deformation comprises, a plurality of circular ridges on the external periphery of said male connecting piece, and a plurality of circular ridges on a portion of the internal cylindrical periphery of said spherical ring member.

9. The device of claim 8 wherein, said circular ridges of the male connecting piece and the spherical ring member are of the same profile.

10. The device of claim 8 further comprising, radial grooves in the internal periphery of said spherical ring member, said radial grooves extending through said circular ridges of said spherical ring member.

11. A connecting installation for disconnectable connecting together spaced apart ends of two conduits having axes generally perpendicular to each other comprising, two connecting devices as claimed in claim 1, a conduit element having a rectilinear portion and a right angle end portion extending from the rectilinear portion, the male connecting pieces of said two devices being fixed to the ends of said tubular conduit element, and the female connecting pieces of said two devices being fixed to the ends of said two conduits.

12. The installation of claim 11, wherein said rectilinear portion further comprises at an end opposite the right angle end portion, two successive right angle parts, an end one of said right angle parts having its geometrical axis located substantially in a median plane of the spherical ring member of the male connecting piece of said right angle end portion.

* * * * *